United States Patent [19]

Birbas

[11] Patent Number: 4,934,631
[45] Date of Patent: Jun. 19, 1990

[54] LIGHTER-THAN-AIR TYPE VEHICLE

[75] Inventor: Louis G. Birbas, St. George, Utah

[73] Assignee: Ulysses Corporation, St. George, Utah

[21] Appl. No.: 294,214

[22] Filed: Jan. 9, 1989

[51] Int. Cl.$^5$ .............................................. B64B 1/02
[52] U.S. Cl. ...................................... 244/30; 244/51; 244/97; 244/125; 244/126
[58] Field of Search ...................... 244/29, 51, 52, 96, 244/97, 98, 125, 126, 128, 30

[56] References Cited

U.S. PATENT DOCUMENTS

| | | | |
|---|---|---|---|
| 12,250 | 7/1904 | Berry | 244/51 |
| 988,597 | 4/1911 | Schütte | 244/128 |
| 1,556,459 | 10/1925 | Szymanski | 244/97 |
| 1,629,843 | 5/1927 | Silver | 244/97 |
| 1,682,961 | 9/1928 | Hall | 244/97 |
| 1,724,440 | 8/1929 | Wallis et al. | 244/125 |
| 1,727,210 | 9/1929 | Many | 244/97 |
| 1,797,502 | 3/1931 | Hall | 244/97 |
| 1,834,614 | 12/1931 | Hall | 244/97 |
| 1,977,392 | 10/1934 | Mackenzie | 244/51 |
| 2,396,494 | 3/1946 | Donnell et al. | 244/128 |
| 3,129,911 | 4/1964 | Fitzpatrick | 244/125 |
| 3,222,012 | 12/1965 | Piasecki | 244/51 |
| 3,260,482 | 7/1966 | Stroukoff | 244/51 |
| 3,360,883 | 1/1968 | Glanzer | 403/385 |
| 3,888,446 | 6/1975 | O'Brien et al. | 403/392 |
| 4,032,246 | 6/1977 | Waara | 403/390 |
| 4,643,374 | 2/1987 | Friederich | 244/52 |

FOREIGN PATENT DOCUMENTS

| | | | |
|---|---|---|---|
| 234454 | 5/1911 | Fed. Rep. of Germany | 244/125 |
| 298927 | 5/1920 | Fed. Rep. of Germany | 244/126 |
| 337460 | 6/1921 | Fed. Rep. of Germany | 244/96 |
| 1027680 | 5/1953 | France | 403/392 |
| 1037731 | 9/1953 | France | 403/392 |

Primary Examiner—Charles T. Jordan
Assistant Examiner—Richard W. Wendtland
Attorney, Agent, or Firm—M. Ralph Shaffer

[57] ABSTRACT

A lighter-than-air type vehicle comprising a framework and a series of inflatable lift bags secured to said framework. The lift bags inwardly contain heating elements and a gas, such as hydrogen or helium, in intimate contact with the heater elements. A source of power is coupled to the heater elements is such that the supply of electrical current, for example, to said elements can be varied as to increase or decrease the degree of inflation of the respective lift bags. Propulsion structure is affixed to the framework and preferably comprises a pair of oppositely revolving propellers which are independently controlled. A shroud and interior plate-like vanes surround the propellers and are constructed and powered to vary the air stream, as to direction, coming from the propeller area.

2 Claims, 5 Drawing Sheets

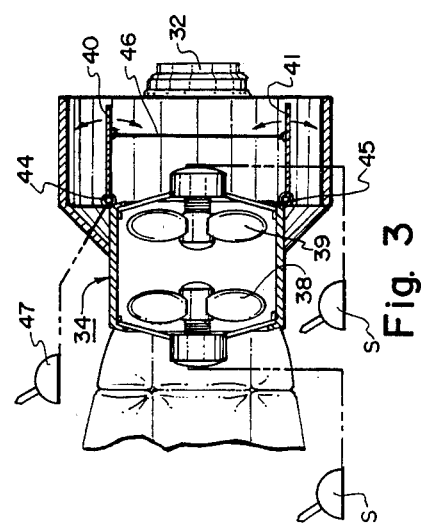
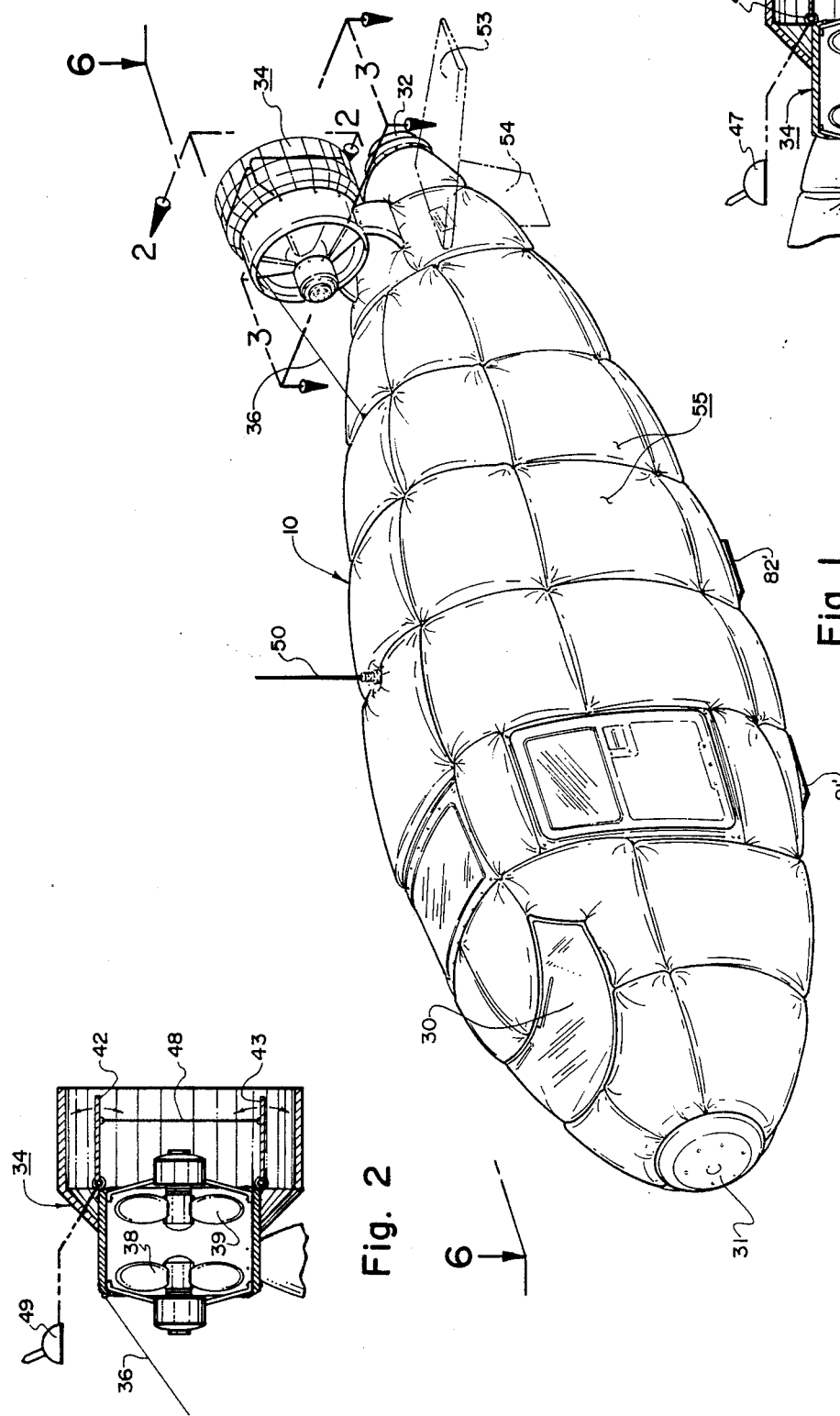

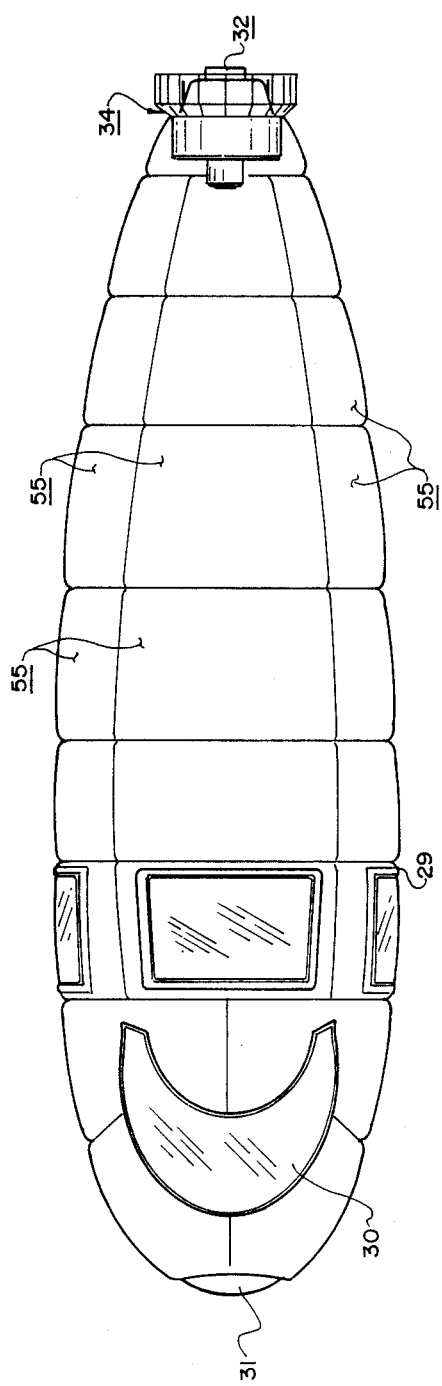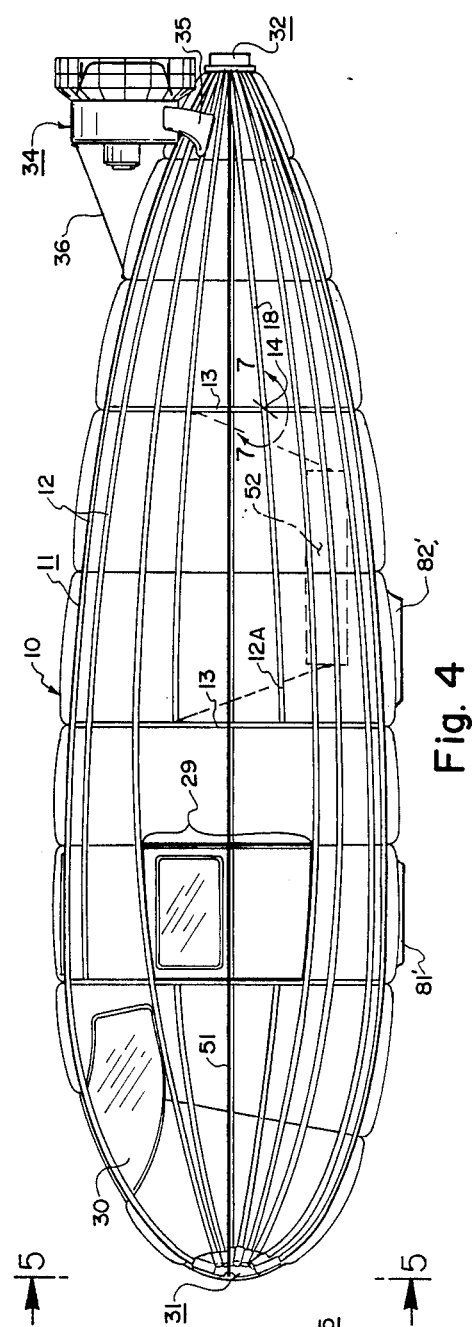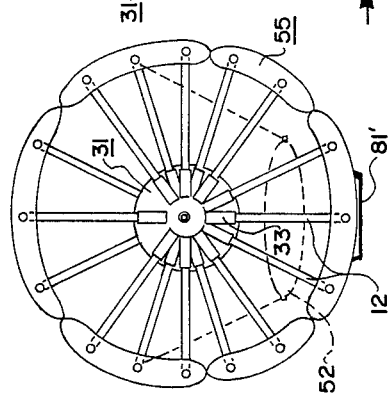

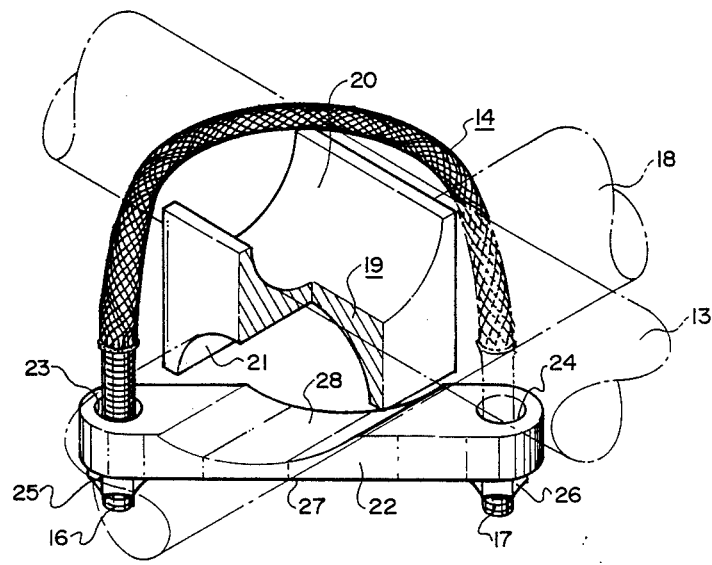
Fig. 10
Fig. 9
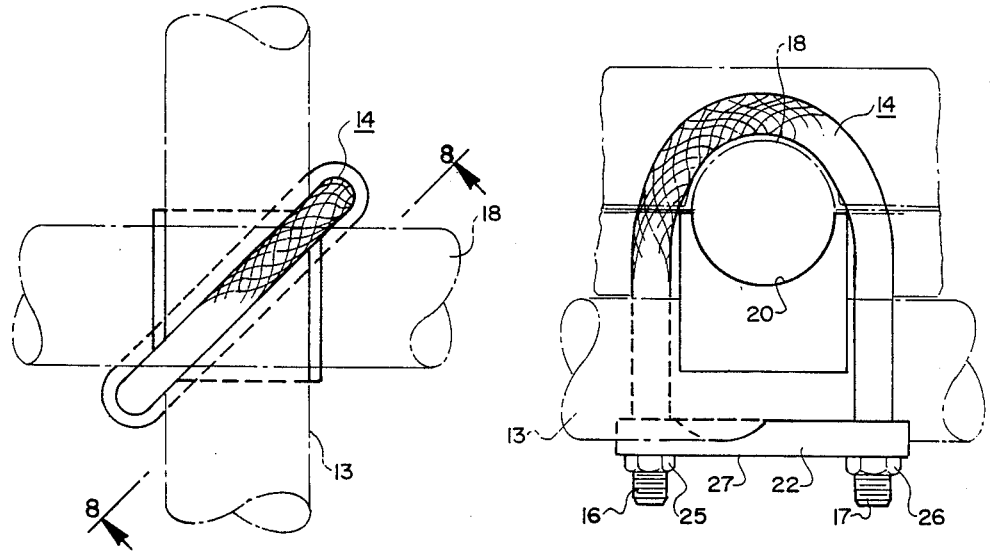
Fig. 7
Fig. 8

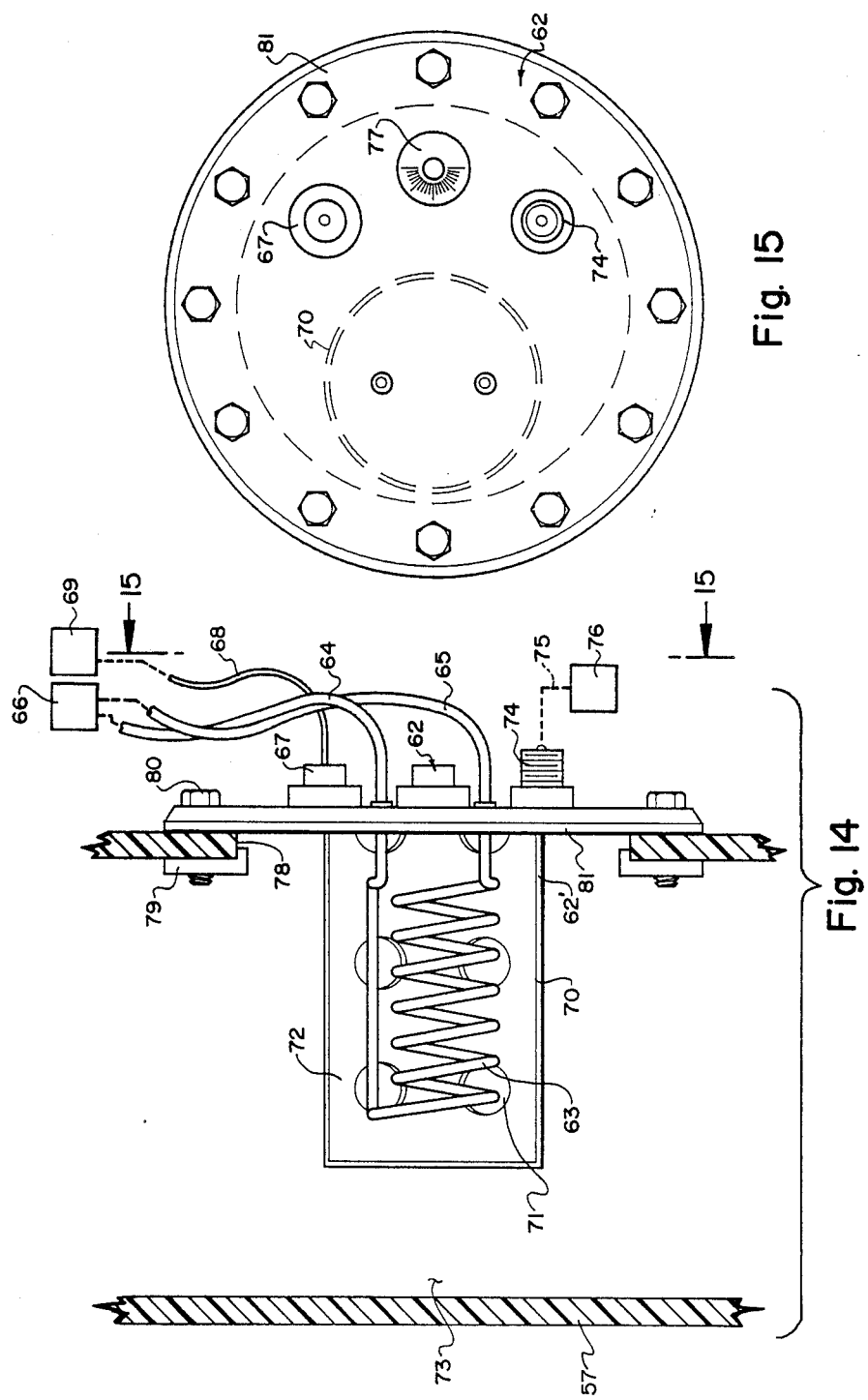

LIGHTER-THAN-AIR TYPE VEHICLE

FIELD OF INVENTION

The present invention relates to the field of dirigibles, particularly, lighter-than-air type craft and, more particularly, provides a new and improved elongate lighter-than-air wherein the lift mechanism comprises a series of lift bags secured to the framework of the vehicles, the lift bags individually containing heating elements so that the interior gaseous pressure and hence the degree of inflation of the lift bags can be adjusted and varied as desired.

BACKGROUND OF INVENTION AND BRIEF DESCRIPTION OF PRIOR ART

In the past, there have been designed and used a series of dirigible designs, other types of lighter-than-air type vehicles, hot-air types of balloons, and so forth. Such are designed for varying uses including passenger transport, rescue work, lift capabilities for timber operations, and also transport of goods and supplies. The present invention relates to a lighter-than-air type craft or vehicle wherein the framework thereof, made of lightweight material, has attached thereto a series of inflated or inflatable lift bags which are preferably secured together to enclose fully the frame work of the vehicle. The individual lift bags include a very light, "lighter-than-air" gas such as hydrogen or helium, for example, and, in particular, is provided with a respected heating element coupled to an outside source of power or heat-deriving substance. Controls are likewise included so that the temperate of the individual heating elements of the respective lift bags can be varied, thereby varying the degree of inflation of the respective lift bags flowing to the desired gas expansion for particular operating pressures. A unique propulsion system is provided and has suitable controls and a powerful source contained within the framework of the vehicle.

No prior art is known relative to the invention specifically described and taught in the claims appended hereto.

Specifically, there appears to be no teaching in the prior art for the inclusion of heating elements within lift bags proper, nor the concept of securing the lift bags to framework as well as the provision of providing a power source for varying the temperature of the heating elements and hence the expansion of gases within the lift bags so as to vary the lift-to-deadweight ratios.

BRIEF DESCRIPTION OF PRESENT INVENTION

According to the present invention, a lighter-than-air type of craft or vehicle is elongate and includes a framework preferably provided a door and a forwardly facing window. The framework generally comprises a series of stringers which are mutually spaced and held in position by lightweight bulkheads taking the form simply of hoop-like conduit, the latter being longitudinally mutually spaced and also being transverse in orientation relative to the longitudinal axis of the vehicle. Specialized clamping means are preferably incorporated for clamping the individual stringers at various points to the transfers hoop-like bulkhead elements. A series of lift bags are secured and generally will be exteriorly disposed relative to the framework. These lift bags include heating elements and also at least a preliminary supply of light gas such as helium or even hydrogen. Where hydrogen is employed, it will be essential, of course, that flame-resistant barriers and/or inner or outer layers of the lift bags be employed.

In any event, heating elements will be mounted to the interior sides of the respective lift bags, the heating elements actually protruding into the open area of each lift bag and being in heat-communication with the gaseous medium contained in the lift bags. Also, gas ports which are normally closed can be used for the introduction of additional gas media, of whatever type, into the individual lift bags.

In one form of the invention, the lift bags have, in effect, central tubes extending end-to-end relative to each bag and communicating with the exterior; these tubes are for the purpose of receiving and containing one or more stringers of the framework, this so that the individual lift bags may be securely mounted to such framework.

The framework itself includes a transverse fuel tank, also serving as a ballast, and disposed beneath a center of gravity of the vehicle. Also, a propulsion system is secured to the framework and preferably includes counter-rotating propellers which are independently driven and controlled as to speed. This is for maneuverability purposes. As to completion of maneuverability structure, a shroud encompasses the propellers and contains a series of plate-type vanes which are independently controlled to re-orient the downstream air flow passing through the propellers as to angular orientation relative to longitudinal axis passing through the hubs of such propellers.

Other improvements in the lighter-than-air craft design will appear as to the features fully described in the detailed description of the invention which follows.

OBJECTS

Accordingly, a principal object of the present invention is to provide a new and improved lighter-than-air type of craft or vehicle. A further object is to provide a vehicle of the type described wherein lift bags are employed to supply lift to the vehicle, such bags being secured to the framework of the vehicle, with the bags also containing heating elements, the degree of energization of which can be controlled or varied as desired to effect proper lift as well as lift balance between the bags.

A further object is to provide a lighter-than-air type of vehicle wherein the propulsion system thereof includes a pair of counter-revolving propellers, and with ancillary structure so as to adjust the downstream direction of air passing through the propellers.

An additional object is to provide a new method of making up a framework for a lighter-than-air craft.

An additional object is to provide improved means for securing stringers to bulkheads where versatility and also extreme lightweight conditions are to be preserved.

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings in which:

BRIEF DESCRIPTION OF THE DRAWINGS

FIG. 1 is a perspective view of an elongate lighter-than-air type vehicle according to the principles of the present invention.

FIG. 2 is an enlarged fragmentary vertical section taken along the line 2—2 in FIG. 1.

FIG. 3 is a horizontal section looking down and taken along the lines 3—3 in FIG. 1.

FIG. 4 is a side view of the framework of the vehicle of FIG. 1.

FIG. 5 is a front view of the framework structure of FIG. 4.

FIG. 6 is a schematic plan view of the structure of FIG. 1.

FIG. 7 is an enlarged fragmentary detail taken along the arcuate line 7—7 in FIG. 4.

FIG. 8 is a view taken along the line 8—8 in FIG. 7 and illustrating the manner of clamping securement of a pair of conduit or support structures, stringers and bulkhead tubes relative to an inter-contained block.

FIG. 9 is a plan view of a flexible elongate connector having a pair of mutually opposite threaded end fittings.

FIG. 10 is similar to FIG. 8 and illustrates in another form the manner of securement of transfers cross members to and between a positioning block.

FIG. 14 is an enlarged fragmentary view taken along the arcuate line 14—14 of a heating element structure integral with and made a part of a representative lift bag structure proper.

FIG. 15 is a view taken along the line 15—15 in FIG. 14.

DETAILED DESCRIPTION OF PREFERRED EMBODIMENTS

Figure 11:
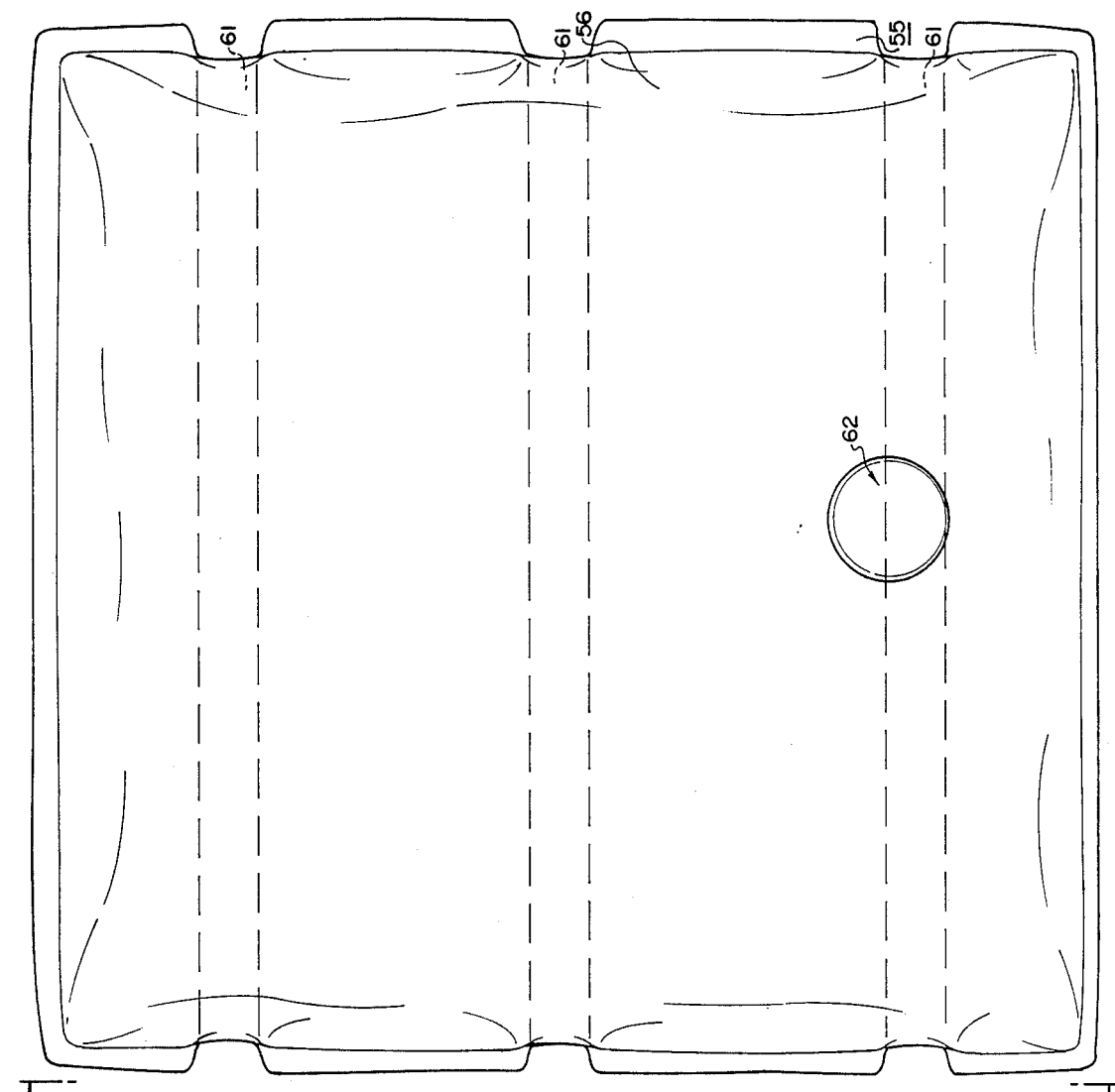
FIG. 11 is a side elevation, from the inside of the vehicle looking outwardly, of a representative lift bag utilize in multiple quantities in the present invention.
Figure 12:
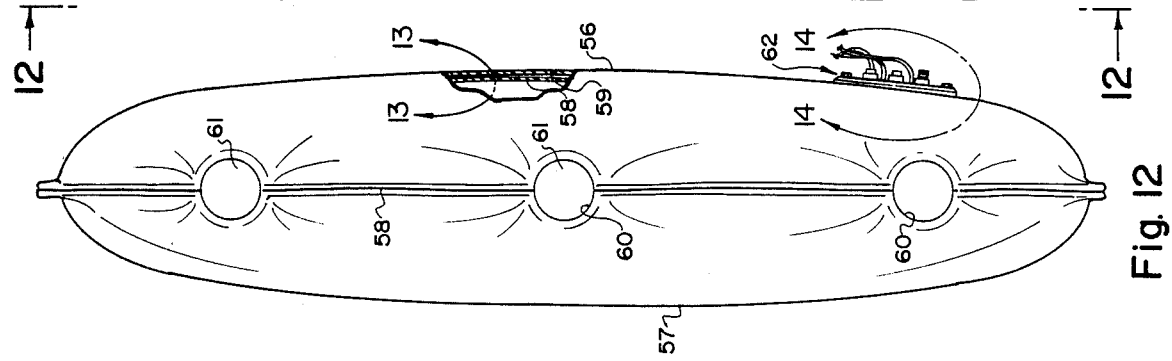
FIG. 12 is an end view of the lift bag taken along the line 12—12 in FIG. 11.

In FIGS. 1 and 4, vehicle 10 is shown to include a framework 11 having a series of stringers 12, of longitudinal orientation, secured to a series of transverse, longitudinally mutually spaced bulkheads or bulkhead tubes 13.

In practice, the bulkheads may comprise simply annular conduit rings or hoops that are secured to the stringers as by clamps 14, or simply by welding, soldering or other means. Preferably the stringers as well as the bulkhead loops will be fabricated from a very light material such as titanium or a titanium alloy.

Where clamps are employed such as clamps 14 in FIGS. 4, 7, 8 and 10, the same may comprise a deformable, flexible elongate segment 15, see FIG. 9, having threaded end fittings 16 and 17. The latter may be welded, soldered or otherwise secured to segment 15. The flexible elongate connector segment 15 may comprise a twisted wire cable segment, a braided wire section, a multiple-strand or multiple-fiber unit made of graphite fiber, for example, an elastomeric or plastic segment, and so forth. There are various methods of attachment to the end fittings as by welding, soldering, shrink plastic fitting, gluing or cementing, or otherwise, which can be employed to secure the threaded end connectors 16 to opposite ends of segment 15. If desired, a spacer block 19 can be incorporated to the tubular conduit 13 and 18 which are in cross-configuration. Block 19 may have a pair of mutually transverse concavities 20 and 21 disposed in position for receiving the respective outer peripheries of adjacent sections of conduit 13, 18 being secured together by the clamp. The clamp itself may include the clamp member 14 and a crossbar-plate 22 provided with apertures 23 and 24. The threaded end fittings 16 and 17 are provided with nuts 25 and 26 which are threaded against the reaction surface 27 of the crossbar-plate 22. The upper surface 28, if desired, may be concave to further aid in the securement of the clamp, and specifically in nesting the tubular member 18 as a clamp is being tightened.

The inventor has filed a co-pending patent application entitled "Flexible Clamp", U.S. Ser. No. 294213 which is fully incorporated herein by way of reference; such earlier filed patent application details various structures and types of fabrication, as well as a method of fabrication, relative to the clamping means shown in FIGS. 4 and 7-10.

These clamps may be used at a variety of junctures of the longitudinal stringers 12 relative to bulkhead tubular hoops 13. Of course, other types of inner securement as between the bulkhead rings and the stringers can be employed.

The framework of FIG. 4 may be supplied a door 29 as well as a forward windshield area 30. In practice, forward and rearward end plates 31 and 32 may be supplied. See FIGS. 1, 4 and 5. As to end plate 31, the same may be provided with a series of receptacles 33 comprising means for receiving the forward ends of stringers 12. Rear end plate 32 may be similarly constructed as end plate 31 for receiving the aft or rearward extremities of the stringers.

Secured to a rearward section of the framework, as seen in FIGS. 1-4, is propulsion structure 34 which may be secured to rear bulkheads and/or stringers or associated structure by suitable attachment braces 35, for example. Guy wire 36 may also be employed to add rigidity to the propulsion structure.

Propulsion structure 34 includes a shroud 37 and, centrally secured therein and thereto, a pair of oppositely revolving propeller units 38 and 39. These may be driven by independent motors and independently actuated by pilot control systems which are manually or otherwise actuatable in the pilot compartment at 41 in FIG. 1.

Likewise secured to the shroud support structure at 37 or associated structure, are four plate vanes 40-43, arranged in quadrature within the shroud.

Vane plates 40 and 41 may be pivoted at 44 and 45, and secured together by crossbar 46 so as to the operable in tandem via a control 47 disposed in the pilot's compartment. Thus, the vanes angularly moveable in tandem as indicated so as to direct either to the right or to the left the exhaust air stream from the propeller section, thereby enabling the vehicle to turn either to the right or to the left. The structure above described relates of course to FIG. 3.

In FIG. 2, a top plan essentially in section relative to the above structure, illustrates the aforementioned operation as to up-and-down vehicle control. As to FIG. 2., a vertical section taken along the line 2—2 in FIG. 1, illustrates upper and lower vanes 42 and 43 connected together in tandem by a link 48 and controlled as to angular disposition by a control linkage 49 actuated at the pilot's compartment. Accordingly, control linkage 47 directs the exhaust air stream to the right or to the left whereas control linkage 49 in FIG. 2 controls the exhaust air stream whereby to direct the same either upwardly or downwardly, thereby facilitating additional maneuverability by permitting the pilot to guide the vehicle either downwardly or upwardly, that is, in descent or incline.

Radio equipment including an antenna at 50 may be supplied the vehicle in the manner shown in FIG. 1. Relative to FIG. 4, a taut cable 51 may be secured at its opposite ends to inner portions of plates 31 and 32 so as to aid in rigidly retaining opposite ends of the stringers in the manner desired and as indicated, see FIG. 5.

As may be desired, a fuel tank 52 may be provided beneath the center of gravity of the framework and be attached to opposite stringers as at 12A in a manner as to provide a ballast for the vehicle whereby to tend to keep the same erect.

Fins 53 and 54, for example, may be attached to the framework above described and utilized to augment vehicle stability and guidance in the air.

Figure 13:
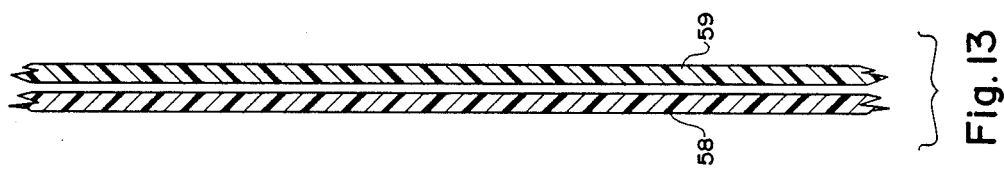
FIG. 13 is an enlarged detail, taken along the line 13—13 in FIG. 12, of multiple-ply sheets of the lift bag, one of the same comprising a flame-resistant material where a light gas such as hydrogen is used in the interior of the bag.

FIGS. 1, 6, 11 and 12, by way of example, illustrate that a series of lift bags 55 are preferably mutually secured together and also, in particular, to the framework 11 of the vehicle. Such securement preferably takes place at the stringer areas relative to stringers 12. The bags themselves, see FIGS. 11 and 12, include inner and outer layers 56 and 57 which are heat-seamed or otherwise secured together at common juncture 58. In the case of hydrogen gas being employed, then a double lining can be employed as seen at FIG. 13 and also FIG. 12, wherein either the inner or outer liner at 58 or 59 may be flame resistant.

Tubes or tubular portions at 60 are sealingly secured to and within the structure and form opening 61 through which corresponding stringers will pass. Accordingly, the stringers themselves may be used for mounting the several lift bags. The lift bags are inflatable, preferably of flexible and possibly of elastomeric nature, whereby increases in pressure of gas, such as hydrogen or helium contained within the individual lift bags, will expand the bags outwardly to expand their volume and hence their lift capacity. The inner layer or bag portion at 56 may be supplied with structure at 62. See FIG. 12 which is detailed in FIGS. 14 and 15. In summary, structure 62′ forms a heating element structure, with the heating element 63 being supplied leads 64 and 65 connected to a battery or to another electrical power-source or other heat source at 66. A control unit 67 for varying the temperature of the heating element can be provided and connected by lead 68 to source 69. Inner canister 70 is apertured at 71, for example, for the receipt of gases within the lift bag at inner area 72. The lift bag may be likewise be supplied with a gas inlet 74 which is coupled by line 75 to gaseous media source 76. This may be used as a primary or topping supply of gas for the individual respective lift bags if desired. Suitable controls may be supplied at 77 for varying either gas pressure or temperature as exhibited within the individual lift bag. Aperture 78 is contained within a section of the lift bag, and suitable clamping means at 79 and bolt means at 80 will serve to secure the over-all structure 62 at plate 81 to the lift bag proximate and over aperture 78.

The lift bags may be fed by individual lines to a single source of gas supply, such as a hydrogen or helium reservoir, or of course, individual storage units may be supplied the respective bags, as desired.

The important point is that the regulation of the temperature of the heater element at 71, and its intimate association with a gas contained within a respective lift bag, will operate to expand the bag, by increasing gas pressure inside, so that the bag takes up a greater space volume. This, of course, displaces atmospheric air so as to render, in essence, a "lighter-than-air" structure. Thus, with heat expansion of the gas within the several lift bags, the volumeric total of the lift bags becomes greater so as to increase the lift capacity of the vehicle. Accordingly, it is seen that the bags, rather than being inflated and deflated within the interior of the framework and being supplied the usual compressors and so on for increasing and reducing volumetric characteristic, the bags are integrally used relative to the framework for supplying not only the skin or covering for the framework but also for enabling variable lift capacity through progressive inflation and deflation of the bag as controlled by individual heater units that are temperature regulated at control 77. Separate controls or a single control, of conventional design, may be used for regulating the temperature of the gas within each of the respective lift bags.

Accordingly, what is provided is a new and improved lighter-than-air type of vehicle for which may be either manned or unmanned, but which includes in addition to a propulsion unit having useful means for varying the direction of air exhaust propulsion, also includes a framework provided with a series of lift bags the several inflations of which are controlled by heater elements within the individual lift bags. These heater elements, again, are useful in raising or lowering the temperate of the heater elements within the individual bags and thereby regulate the expansion of the gases and hence the expansion of the lift bags themselves, for varying lift as needed. Thus, for assent purposes, the bags will be inflated in a marked degree; controlled descents are available not only by operating the vanes 42 and 43 in FIG. 2, but also by progressively lowering the pressures within the individual lift bags so that these will collapse slightly, this by virtue of lowering the temperature of the heating elements contained therein. Skid plates as at 81 and 82 may be supplied to framework exterior of the outer periphery of the bags and connected to the underside of the vehicle. Direct upward lift will be provided by merely inflating all of the bags as by raising the temperatures of the gases contained therein by the heater elements as above described.

In FIG. 1, the windows and door, and also the right side window (not shown), may be designed to serve also as escape hatches. The aircraft vehicle is a safety-oriented aircraft, with the material of the bags being projectile-, rip-, and crashresistant as by use of Kevlar or other similar material. The vehicle is omni-directional, and may have a battery backup, not shown, for landing. The lift bags can be different sizes, for proper lift function. The vehicle is also designed for use in different environments, such as for use as a space-operable vehicle.

While particular embodiments of the present invention have been shown and described, it will be obvious to those skilled in the art that changes and modifications maY be made without departing from this invention in its broader aspects, and, therefore, the aim in the appended claims is to cover all such changes and modifications as fall within the true spirit and scope of this invention.

I claim:

1. An inflatable air bag for lighter-than-air type vehicles, said air bag having a flame-resistant liner, said air bag being provided with an interior heating element and a lighter-than-air gas in intimate contact with said heating element, said air bag also including sealed tubular portions communicating with the exterior and passing through opposite ends of said air bag for receiving external structural mounting support thereat.

2. An elongate vehicle including, in combination: a framework provided a door and a forwardly facing window; a series of inflatable lift bags secured to and about said framework, said lift bags containing a lighter-than-air gas and being individually provided with respective interior heating element means for variably heating and thereby variably expanding said gas within each of said lift bags; means for heating said heating elements coupled thereto; propulsion structure coupled to and disposed outside of said framework; and means mounted to and within said framework for supplying power to said propulsion structure, and wherein said air bags are each provided with integral tubes communicating with the exterior at opposite ends of said air bags, said air bags being mounted to said framework by portions of said framework passing through said tubes.

* * * * *